United States Patent
Sakai

(10) Patent No.: US 8,670,735 B2
(45) Date of Patent: Mar. 11, 2014

(54) RECEIVER AND METHOD OF ESTIMATING SIGNAL TO NOISE POWER RATIO

(75) Inventor: Masahito Sakai, Minato-ku (JP)

(73) Assignees: NEC Corporation, Tokyo (JP); NTT DoCoMo, Inc, Tokyo (JP)

( * ) Notice: Subject to any disclaimer, the term of this patent is extended or adjusted under 35 U.S.C. 154(b) by 0 days.

(21) Appl. No.: 13/700,386

(22) PCT Filed: May 10, 2011

(86) PCT No.: PCT/JP2011/060724
§ 371 (c)(1),
(2), (4) Date: Nov. 27, 2012

(87) PCT Pub. No.: WO2011/148779
PCT Pub. Date: Dec. 1, 2011

(65) Prior Publication Data
US 2013/0122843 A1   May 16, 2013

(30) Foreign Application Priority Data

May 28, 2010 (JP) ................................ 2010-122186

(51) Int. Cl.
*H04B 17/00* (2006.01)
(52) U.S. Cl.
USPC ................ 455/226.3; 455/67.13; 455/296; 455/334
(58) Field of Classification Search
USPC ............ 455/63.1, 67.11, 67.13, 226.1–226.3, 455/296, 334, 550
See application file for complete search history.

(56) References Cited

U.S. PATENT DOCUMENTS

| | | | |
|---|---|---|---|
| 6,532,258 B1 | 3/2003 | Goldston et al. | |
| 7,006,800 B1 * | 2/2006 | Lashkarian et al. | 455/67.11 |
| 7,231,183 B2 * | 6/2007 | Pauli et al. | 455/67.11 |
| 7,457,588 B2 * | 11/2008 | Love et al. | 455/67.11 |
| 7,852,963 B2 * | 12/2010 | Chen et al. | 375/267 |

FOREIGN PATENT DOCUMENTS

| | | |
|---|---|---|
| JP | 2003-502937 A | 1/2003 |
| JP | 2005-086587 A | 3/2005 |
| JP | 2007-129747 A | 5/2007 |
| JP | 2010-050967 A | 3/2010 |

OTHER PUBLICATIONS

Ericsson, System-level evaluation of OFDM—further considerations, 3GPP TSG-RAN WG1 #35 R1-031303, Nov. 21, 2003.

(Continued)

*Primary Examiner* — Nhan Le
(74) *Attorney, Agent, or Firm* — Sughrue Mion, PLLC

(57) ABSTRACT

Provided are a receiver and a method of estimating signal to noise power ratio. The receiver estimates a signal-to-noise power ratio, according to an average value of a signal power and an average value of a noise power of a reference signal mapped to the received signal, estimates signal-to-noise power ratio by means of EESM operation according to each signal-to-noise power ratio of the reference signal, makes a judgment on a magnitude of either the signal-to-noise power ratio appointed according to the average values or the signal-to-noise power ratio estimated by means of the EESM operation, and outputs one of the signal-to-noise power ratio appointed according to the average values and the signal-to-noise power ratio estimated by means of the EESM operation, as a reception quality SNR, in response to the judgment result.

8 Claims, 4 Drawing Sheets

(56) References Cited

OTHER PUBLICATIONS

Shahid Mumtaz et al, "EESM for IEEE 802. 16e: WiMaX", 7th IEEE/ACIS International Conference on Computer and Information Science, IEEE ICIS/ACIS, May 14-16, 2008, pp. 361-366.

3GPP, TS 36. 133 V8. 7. 0, LTE; Evolved Universal Terrestrial Radio Access (E-UTRA); Requirements for support of radio resource management; the Sep. 2009 issue.

3GPP, TS 36. 213 V8. 8. 0, $3^{rd}$ Generation Partnership Project; Technical Specification Group Radio Access Network; Evolved Universal Terrestrial Radio Access (E-UTRA); Physical layer procedures (Release 8); the Sep. 2009 issue.

International Search Report of PCT/JP2011/060724 dated Jun. 7, 2011.

* cited by examiner

RECEIVER AND METHOD OF ESTIMATING SIGNAL TO NOISE POWER RATIO

CROSS REFERENCE TO RELATED APPLICATIONS

This is a U.S. national stage of application No. PCT/JP2011/060724, filed on May 10, 2011. Priority under 35 U.S.C. §119(a) and 35 U.S.C. §365(b) is claimed from Japanese Patent Application No. 2010-122186, filed on May 28, 2010, the disclosure of which is also incorporated herein by reference.

TECHNICAL FIELD

The present invention relates to a receiver and a method for estimating a Signal to Noise Power Ratio (SNR) in a wireless communication.

BACKGROUND ART

An Orthogonal Frequency Division Multiplexing (OFDM) method, such as Long Term Evolution (LTE), standardized by 3rd Generation Partnership Project (3GPP) attracts attention as a communication method for the next generation. In a communication method such as LTE, a receiver needs to conduct determination on synchronization on the basis of reception quality of a control channel, and to report a state of synchronization to a higher-level layer, as stipulated in NPL 1 and NPL 2. Then, the higher-level layer makes a judgment on a start and an end of a process of transmission to a base station, according to information such as a result of determination on synchronization by the receiver, and so on.

In a conventional Wideband-Code Division Multiple Access (W-CDMA) communication method, the determination on synchronization is conducted by way of comparing a Signal-to-Interference Ratio (SIR) value measured by the receiver, with criterion values called Qin and Qout.

In the meantime, adding a moving average process is proposed in PTL 1. Thus, the process makes it possible to stably conduct determination on synchronization and transmission control even when a measured SIR value includes a variation.

Meanwhile, in the OFDM communication method, used is Exponential Effective SNR Mapping (EESM), as described in NPL 3. Using EESM makes it possible to calculate an SNR representing a reception quality (hereinafter called "reception quality SNR") in a reflection of a Block Error Ratio (BLER) of a control channel, being independent of channel propagation conditions.

CITATION LIST

Patent Literature

PTL1: JP2005-086587A

Non Patent Literature

NPL1: 3GPP, TS 36.133 v8.7.0, the September 2009 issue.
NPL 2: 3GPP, TS 36.213 v8.8.0, the September 2009 issue.
NPL 3: S. Mumtaz, A. Gamerio, J. Rodriguez, EESM for IEEE 802.16e: Wimax, 7th IEEE/ACIS International Conference on Computer and Information Science, IEEE ICIS/ACIS 2008, 14-16 May 2008.

SUMMARY OF INVENTION

Technical Problem

Unfortunately, EESM requires complicated processing so that the volume of arithmetic processing by a receiver amounts a lot. Furthermore, EESM requires a significantly great bit width in a high SNR area. Therefore, in the case where only a limited bit width can be used, an underflow is caused in an area for a certain SNR value or greater so that unfortunately it becomes impossible to accurately calculate an SNR value.

Thus, it is an object of the present invention to provide a receiver and a method for estimating a Signal to Noise power Ratio, with which the volume of arithmetic processing as well as a bit width can be reduced.

Solution to Problem

According to a first aspect of the present invention, provided is a receiver including: a reception quality SNR estimation unit for estimating a reception quality SNR representing a quality of a received signal; wherein the reception quality SNR estimation unit includes: a signal power and noise power estimation unit for estimating a signal power and a noise power, of a reference signal mapped to the received signal; an EESM operation unit for estimating a signal-to-noise power ratio by means of EESM (Exponential Effective SNR Mapping) operation according to each signal-to-noise power ratio of the reference signal; and a reception quality judgment unit for calculating a signal-to-noise power ratio according to each average value of the signal power and the noise power estimated by the signal power and noise power estimation unit, making a judgment on a magnitude of either the signal-to-noise power ratio last above or the signal-to-noise power ratio calculated by the EESM operation unit, and outputting one of the signal-to-noise power ratios as a reception quality SNR.

According to a second aspect of the present invention, provided is a method for estimating a signal-to-noise power ratio in order to estimate a reception quality SNR representing a quality of a received signal, including the steps of estimating a signal-to-noise power ratio, according to an average value of a signal power and an average value of a noise power, of a reference signal mapped to the received signal; estimating a signal-to-noise power ratio by means of EESM operation according to each signal-to-noise power ratio of the reference signal; making a judgment on a magnitude of either the signal-to-noise power ratio appointed according to the average values or the signal-to-noise power ratio estimated by means of the EESM operation; and outputting one of the signal-to-noise power ratio appointed according to the average values and the signal-to-noise power ratio estimated by means of the EESM operation, as a reception quality SNR, in response to the judgment result.

Advantageous Effect of Invention

According to the present invention, a bit width required for arithmetic processing by a receiver can be reduced by means of executing normal SNR arithmetic processing for a high SNR value, and executing reception quality SNR calculation processing by using EESM for a low SNR value. Moreover, executing EESM operation only for a low SNR value makes it possible to reduce the volume of arithmetic processing by the receiver.

DESCRIPTION OF EMBODIMENTS

Exemplary embodiments of the present invention are explained below with reference to the accompanied drawings.

Configuration Example

Figure 1:
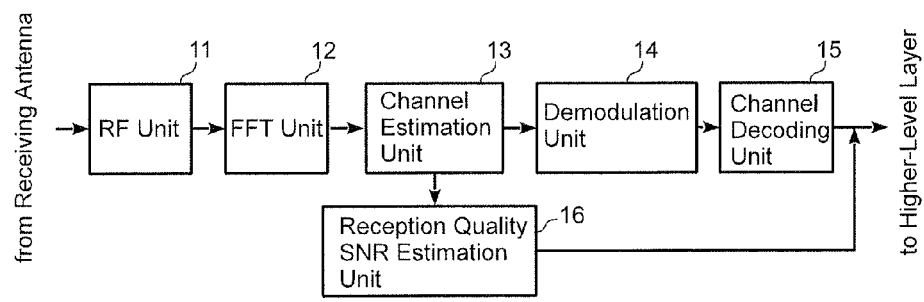
FIG. 1 is a block diagram showing a configuration example of a receiver according to an embodiment of the present invention.

FIG. 1 is a block diagram showing a configuration example of a receiver according to an embodiment of the present invention. On this occasion, explanation is made, while using a receiver of LTE standardized in 3GPP as an example. In LTE, information is transmitted, while being mapped to a plurality of sub-carriers. In the meantime, for synchronization, a known signal (Reference Signal: RS) is mapped to each of the plurality of sub-carriers.

The receiver includes a radio frequency (RF) unit 11, a Fast Fourier Transform (FFT) unit 12, a channel estimation unit 13, a demodulation unit 14, a channel decoding unit 15, and a reception quality SNR estimation unit 16.

The RF unit 11 analog-digital-converts a signal received with a receiving antenna, not shown, and outputs a digital received signal. The FFT unit 12 carries out FFT operation on the digital received signal output from the RF unit 11 to break down the signal into data of frequency-wise components. By using an RS already mapped on a frequency-wise resource, the channel estimation unit 13 estimates a channel estimation matrix that represents a channel status, on the basis of the data of frequency-wise components obtained from the FFT unit 12. On the basis of the digital received signal output from the RF unit 11, the channel estimation matrix estimated by the channel estimation unit 13, and the like, the demodulation unit 14 demodulates from I-Q components into likelihood information. The channel decoding unit 15 carries out error-correction decoding and error detection with respect to a signal demodulated by the demodulation unit 14.

In the meantime, the reception quality SNR estimation unit 16 estimates a reception quality SNR, on the basis of the channel estimation matrix estimated by the channel estimation unit 13. Then, the reception quality SNR estimated is used for a determination process on synchronization in a higher-level layer.

Figure 2:
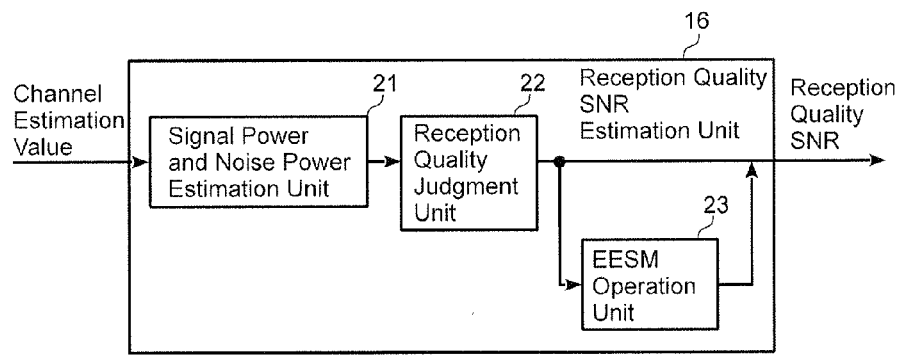
FIG. 2 is a block diagram showing a configuration example of a reception quality SNR estimation unit 16 in the receiver shown in FIG. 1.

FIG. 2 is a block diagram showing a configuration example of the reception quality SNR estimation unit 16 in the receiver shown in FIG. 1.

The reception quality SNR estimation unit 16 includes a signal power and noise power estimation unit 21, a reception quality judgment unit 22, and an EESM operation unit 23. The signal power and noise power estimation unit 21 estimates an average value of a signal power and an average value of a noise power, of an RS mapped to a received signal, in order to estimate a signal-to-noise power ratio. The reception quality judgment unit 22 makes a judgment on a magnitude of the signal-to-noise power ratio estimated by the signal power and noise power estimation unit 21; and outputs the signal-to-noise power ratio estimated by the signal power and noise power estimation unit 21 as a reception quality SNR, if the signal-to-noise power ratio estimated by the signal power and noise power estimation unit 21 is greater than a predetermined threshold value. The EESM operation unit 23 estimates a signal-to-noise power ratio by means of EESM operation, according to the signal-to-noise power ratio of each RS, and outputs the estimated signal-to-noise power ratio as a reception quality SNR.

[Operation of Reception Quality SNR Estimation Unit]

Figure 3:
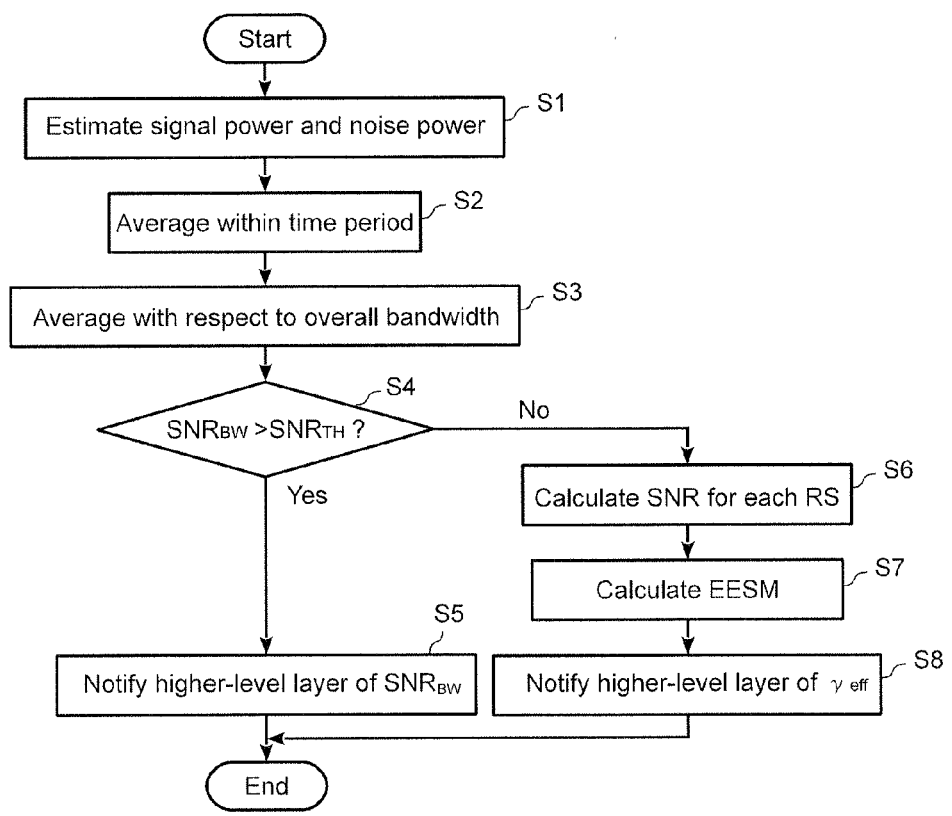
FIG. 3 is a flowchart for explaining operation of the reception quality SNR estimation unit shown in FIG. 2.

FIG. 3 is a flowchart for explaining operation of the reception quality SNR estimation unit 16.

The signal power and noise power estimation unit 21 estimates a signal power and a noise power of each RS (Step S1).

The reception quality judgment unit 22 estimates an averaged signal power "$S_{ave}$" and an averaged noise power "$\sigma^2_{ave}$" within a time period of a measuring object according to formula (1), on the basis of the signal power and the noise power estimated by the signal power and noise power estimation unit 21 (Step S2).

{Math. 1}

$$S_{ave}(i) = \sum_{n=n_{start}}^{n_{end}-1} \sum_{a=0}^{N_{rx}-1} \sum_{b=0}^{N_{tx}-1} S(a, b, n, i) \quad (1)$$

$$\sigma^2_{ave}(i) = \sum_{n=n_{start}}^{n_{end}-1} \sum_{a=0}^{N_{rx}-1} \sum_{b=0}^{N_{tx}-1} \sigma^2(a, b, n, i)$$

wherein "a" and "b" represent a receiving antenna and a transmission antenna, respectively; "n" is a slot number; "i" is an RS index; "S" and "$\sigma^2$" represent a signal power and a noise power, respectively; "$N_{rx}$" shows the number of receiving antennas; "$N_{tx}$" shows the number of transmission antennas; "$n_{start}$" is a slot number for a start of measurement; and "$n_{end}$" is a slot number for an end of measurement.

Then, the reception quality judgment unit 22 averages the signal power and the noise power with respect to their overall bandwidth according to formula (2), and calculates SNR for the overall bandwidth ($SNR_{BW}$) (Step S3).

{Math. 2}

$$SNR_{BW} = \frac{\sum_{i=0}^{N_{RS}-1} S_{ave}(i)}{\sum_{i=0}^{N_{RS}-1} \sigma_{ave}^2(i)} \quad (2)$$

wherein "$N_{RS}$" represents the number of RSs included in the bandwidth.

Subsequently, the reception quality judgment unit 22 compares the SNR, calculated through the above process, to a predetermined threshold value ($SNR_{TH}$) (Step S4). If the calculated SNR is greater than the threshold value, the reception quality judgment unit 22 recognizes the SNR value to be a reception quality SNR, and notifies the higher-level layer of the value as it is (Step S5). Meanwhile, if the calculated SNR is less than the threshold value, the reception quality judgment unit 22 makes the EESM operation unit 23 operate.

At first, the EESM operation unit 23 calculates $SNR(\gamma_i)$ of each RS, according to formula (3), (Step S6).

{Math. 3}

$$\gamma_i = \frac{S_{ave}(i)}{\sigma_{ave}^2(i)} \quad (3)$$

Then, the EESM operation unit 23 calculates a reception quality SNR, according to formula (4), (Step S7), and notifies the higher-level layer of it (Step S8).

{Math. 4}

$$\gamma_{eff} = -\beta \ln \frac{1}{N_{RS}} \sum_{i=0}^{N_{RS}-1} e^{-\frac{\gamma_i}{\beta}} \quad (4)$$

wherein "$\beta$" is a parameter to be determined on the basis of the number of transmission-receiving antennas, a bandwidth, a code rate of a control channel, and so on; and the parameter is adjusted in such a way that the same reception quality SNR is output with respect to the same BLER even under different propagation conditions.

[Explanation of Advantageous Effect]

Figure 4:
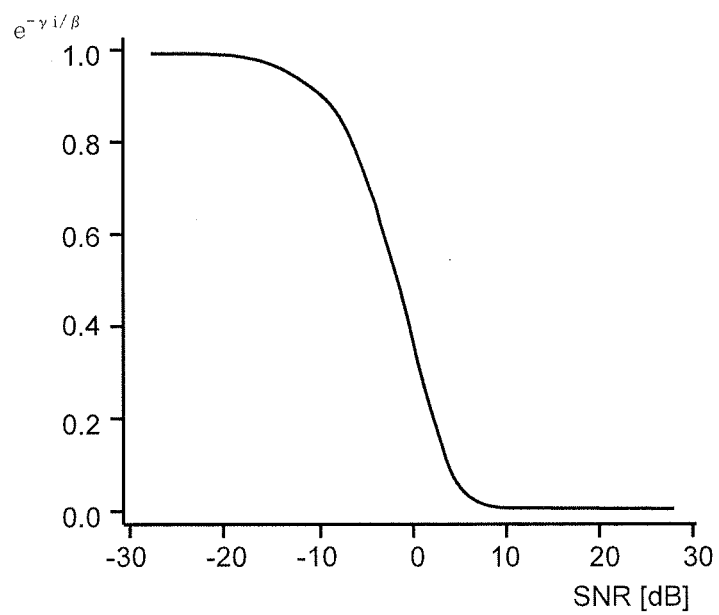
FIG. 4 is a drawing that explains advantageous effects of an embodiment shown in FIG. 1 through FIG. 3, and the drawing shows a value of $e^{-\gamma i/\beta}$ in relation to SNR.
Figure 5:
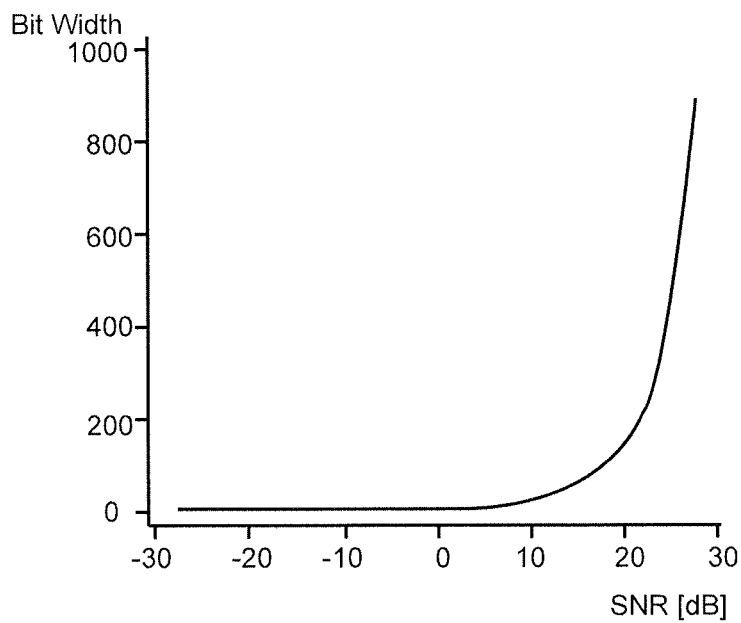
FIG. 5 is a drawing that explains advantageous effects of the embodiment shown in FIG. 1 through FIG. 3, and the drawing describes how wide a bit width needs to be for calculating an SNR value in order to express a portion after the decimal point.

FIG. 4 and FIG. 5 are drawings for explaining an effect of the embodiment described above. FIG. 4 shows a value of a formula ($e^{-\gamma_i/\beta}$) described below, which exists in formula (4), in relation to SNR.

{Math. 5}

$$e^{-\frac{\gamma_i}{\beta}} \quad (5)$$

On this occasion, $\beta$ is equal to 1. FIG. 5 is a drawing that describes how wide a bit width needs to be for calculating an SNR value in order to express a portion after the decimal point.

In the case of a high SNR value, the value of $e^{-\gamma_i/\beta}$ existing in formula (4) becomes remarkably small as shown in FIG. 4. Therefore, without making the bit width for calculation wider, the SNR value draws a noise floor at a certain level. In the meantime, the bit width required for expressing a high SNR value becomes wider in an exponential manner, as FIG. 5 definitely shows. Therefore, in EESM operation, it is difficult from a viewpoint of implementation to calculate an SNR value accurately in a high SNR zone. Moreover, calculating a reception quality SNR accurately is needed only for a low SNR value on the border of deviation from synchronization. Meanwhile, formula (4) needs to carry out a complicated operation of an exponential calculation of a power of "e." Therefore, the volume of calculation at a receiver amounts to a lot if an arithmetic operation is always underway.

On the other hand, EESM operation is executed only for a low SNR value in the embodiment described above. Therefore, a reception quality SNR for determination on synchronization can be calculated without deteriorating the performance of determination on synchronization, while a bit width and the volume of calculation at a receiver being not increased.

[Another Configuration Example of Reception Quality SNR Estimation Unit]

Figure 6:
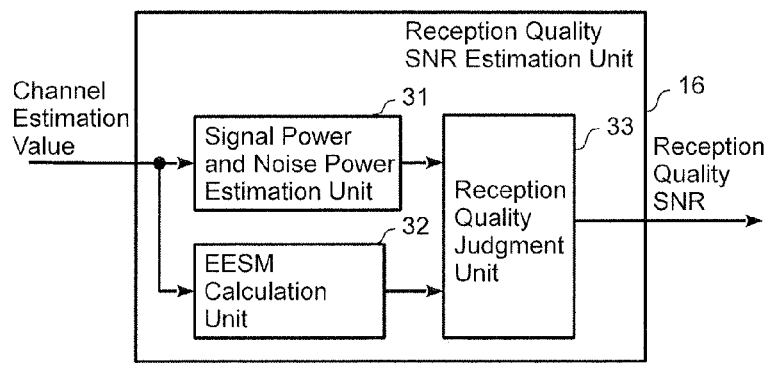
FIG. 6 is a block diagram showing another configuration example of the reception quality SNR estimation unit 16 in the receiver shown in FIG. 1.

FIG. 6 is a block diagram showing another configuration example of the reception quality SNR estimation unit 16 in the receiver shown in FIG. 1.

The reception quality SNR estimation unit 16 includes a signal power and noise power estimation unit 31, an EESM operation unit 32, and a reception quality judgment unit 33. The signal power and noise power estimation unit 31 estimates a signal power and a noise power, of an RS mapped to a received signal. The EESM operation unit 32 estimates a signal-to-noise power ratio by means of EESM operation, according to the signal-to-noise power ratio of each RS. The reception quality judgment unit 33 calculates a signal-to-noise power ratio, according to each average value of the signal power and the noise power estimated by the signal power and noise power estimation unit 31; and outputs the signal-to-noise power ratio estimated by the reception quality judgment unit 33 itself as a reception quality SNR if the signal-to-noise power ratio estimated by the EESM operation unit 32 is greater than a predetermined threshold value; and meanwhile outputs the signal-to-noise power ratio estimated by the EESM operation unit 32 as a reception quality SNR if the signal-to-noise power ratio estimated by the EESM operation unit 32 is less than the predetermined threshold value.

In the configuration example of the reception quality SNR estimation unit 16 shown in FIG. 2, EESM operation is executed only for a low SNR value. On the other hand, in the configuration example shown in FIG. 6, EESM operation is executed at all times; and then the SNR calculated by means of the normal method is notified as a reception quality SNR, only when the output value is greater than the predetermined threshold value.

Figure 7:
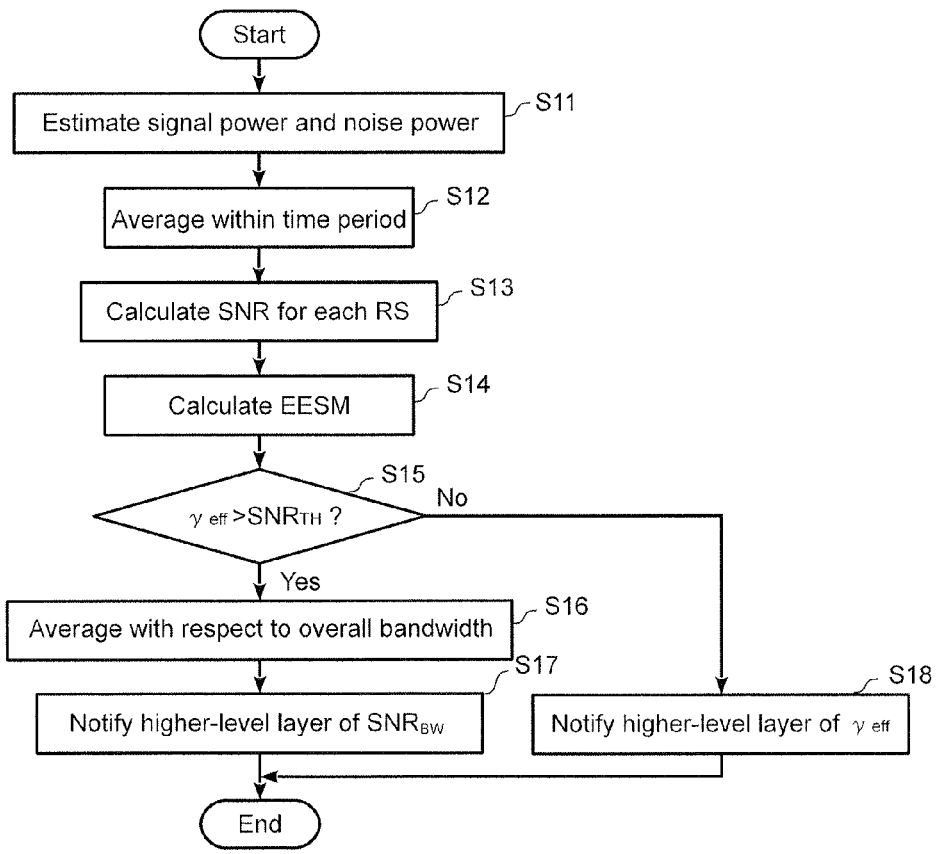
FIG. 7 is a flowchart for explaining operation of the reception quality SNR estimation unit shown in FIG. 6.

FIG. 7 is a flowchart for explaining operation of the reception quality SNR estimation unit 16 shown in FIG. 6.

The signal power and noise power estimation unit 31 calculates a signal power and a noise power of each RS (Step S11).

The reception quality judgment unit 33 estimates an averaged signal power "$S_{ave}$" and an averaged noise power "$\sigma^2_{ave}$" within a time period of a measuring object according to formula (1), on the basis of the calculated signal power and noise power (Step S12).

In the meantime, the EESM operation unit 32 calculates $SNR(\gamma_i)$ of each RS, according to formula (2), (Step S13). Then, the EESM operation unit 32 calculates a reception quality SNR, according to formula (3), (Step S14).

The reception quality judgment unit 33 compares the SNR, calculated by the EESM operation unit 32, to a predetermined threshold value ($SNR_{TH}$) (Step S15). If the SNR, calculated by the EESM operation unit 32, is greater than the threshold value, the reception quality judgment unit 33 averages the signal power and the noise power with respect to their overall bandwidth according to formula (2), and calculates SNR ($SNR_{BW}$) for the overall bandwidth (Step S16), and then notifies the higher-level layer of the calculated value as a reception quality SNR (Step S17). On the other hand, if the SNR, calculated by the EESM operation unit 32, is less than the threshold value, the reception quality judgment unit 33 recognizes the SNR value to be a reception quality SNR, and notifies the higher-level layer of the value as it is (Step S18).

[Explanation of Advantageous Effect]

According to the configuration example described above, although the volume of calculation at the receiver cannot be reduced, the bit width can be reduced. Moreover, in the case of a significantly deteriorated reception quality due to a fading effect, it is possible to accurately measure the reception quality by means of EESM.

In the above explanation, it is assumed that SNR calculation processing and EESM operation for each RS are executed with respect to all RSs at Step S6 and Step S7 in the flowchart shown in FIG. 3 as well as Step S13 and Step S14 in the flowchart shown in FIG. 7. Meanwhile, in LTE, information is mapped to a plurality of sub-carriers for transmission, and the RSs are individually mapped to the plurality of sub-carriers. Therefore, the RSs to be used may be sampled at appropriate intervals. Furthermore, the sampling intervals may be changed in accordance with a bandwidth; namely, the sampling intervals may be controlled in such a way that the sampling intervals are set to be narrower for a narrow bandwidth, and wider for a wide bandwidth.

Moreover, for the averaging process with respect to the overall bandwidth at Step S3 in the flowchart shown in FIG. 3 and at Step S16 in the flowchart shown in FIG. 7, the sampling process can be executed in the same manner.

Although the above explanation is made for a case of communication of a cellular phone making use of LTE, the same method can be applied to a cellular phone making use of OFDM or FDM, a Personal Handy phone System (PHS), and a wireless communication system such as a wireless LAN, and the like.

The invention claimed is:

1. A receiver comprising:
a reception quality SNR estimation unit which estimates a reception quality Signal to Noise Power Ratio (SNR) representing a quality of a received signal;
wherein the reception quality SNR estimation unit includes:
a signal power and noise power estimation unit which estimates signal power and noise power of a reference signal mapped to the received signal;
an EESM operation unit which estimates a signal-to-noise power ratio by means of EESM (Exponential Effective SNR Mapping) operation according to each signal-to-noise power ratio of the reference signal; and
a reception quality judgment unit which calculates a signal-to-noise power ratio according to each average value of the signal power and the noise power estimated by the signal power and noise power estimation unit, makes a judgment on a magnitude of either the signal-to-noise power ratio last above or the signal-to-noise power ratio calculated by the EESM operation unit, and outputs one of the signal-to-noise power ratios as a reception quality SNR.

2. The receiver according to claim 1:
wherein, the reception quality judgment unit outputs the signal-to-noise power ratio estimated by the signal power and noise power estimation unit as a reception quality SNR, if the signal-to-noise power ratio estimated by the reception quality judgment unit itself is greater than a predetermined threshold value; and
the EESM operation unit executes EESM operation, and outputs an estimated signal-to-noise power ratio as a reception quality SNR, if the signal-to-noise power ratio estimated by the reception quality judgment unit is less than the predetermined threshold value.

3. The receiver according to claim 1:
wherein, the reception quality judgment unit outputs the signal-to-noise power ratio estimated by the reception quality judgment unit itself as a reception quality SNR, if the signal-to-noise power ratio estimated by the EESM operation unit is greater than a predetermined threshold value; and outputs the signal-to-noise power ratio estimated by the EESM operation unit as a reception quality SNR, if the signal-to-noise power ratio estimated by the EESM calculation unit is less than the predetermined threshold value.

4. The receiver according to claim 1:
wherein, the received signal is a signal in which information is mapped to a plurality of sub-carriers for transmission;
reference signals above-mentioned are individually mapped to the plurality of sub-carriers; and
the EESM operation unit carries out sampling with respect to reference signals at predetermined intervals, among the reference signals, and estimates the signal-to-noise power ratio.

5. The receiver according to claim 4:
wherein, the sampling intervals are controlled in accordance with a bandwidth to be used for the transmission.

6. The receiver according to claim 1:
wherein, the received signal is a signal in which information is mapped to a plurality of sub-carriers for transmission;
reference signals above-mentioned are individually mapped to the plurality of sub-carriers; and
the signal power and noise power estimation unit obtains an average value of a signal power and an average value of a noise power, of the reference signals, by way of sampling with respect to reference signals at predetermined intervals, among the reference signals.

7. The receiver according to claim 6:
wherein, the sampling intervals are controlled in accordance with a bandwidth to be used for the transmission.

8. A method of estimating signal-to-noise power ratio, estimating a reception quality SNR representing a quality of a received signal, comprising the steps of:
estimating a signal-to-noise power ratio, according to an average value of a signal power and an average value of a noise power, of a reference signal mapped to the received signal;
estimating a signal-to-noise power ratio by means of EESM operation according to each signal-to-noise power ratio of the reference signal;
making a judgment on a magnitude of either the signal-to-noise power ratio appointed according to the average values or the signal-to-noise power ratio estimated by means of the EESM operation; and
outputting one of the signal-to-noise power ratio appointed according to the average values and the signal-to-noise power ratio estimated by means of the EESM operation, as a reception quality SNR, in response to the judgment result.

* * * * *